US005218366A

United States Patent [19]

Cardamone et al.

[11] Patent Number: 5,218,366
[45] Date of Patent: Jun. 8, 1993

[54] EMERGENCY TRANSMITTER BUOY FOR USE ON MARINE VESSELS

[75] Inventors: David P. Cardamone, Lansdale; Eugene F. Keohane, Morton; Robert J. Malloy, Drexel Hill; Albert C. Paulovitz, Kennett Square; Robert L. Muir, Upland, all of Pa.

[73] Assignee: Litton Systems Inc., Beverly Hills, Calif.

[21] Appl. No.: 782,329

[22] Filed: Oct. 24, 1991

[51] Int. Cl.[5] ........ G01S 1/00; B63B 22/00; B63C 9/00; H01H 15/06

[52] U.S. Cl. ........ 342/385; 441/11; 441/80; 455/128; 200/549

[58] Field of Search ........ 342/385, 386; 335/205, 335/207; 441/6, 11, 23, 80, 89; 455/95, 100, 128; 343/709; 200/548, 549, 531, 539, 541

[56] References Cited

U.S. PATENT DOCUMENTS

| | | | |
|---|---|---|---|
| 2,138,387 | 11/1938 | Officer et al. | 200/548 |
| 3,790,912 | 2/1974 | Murphy | 335/205 |
| 4,101,894 | 7/1978 | Warner et al. | 343/709 |
| 4,484,041 | 11/1984 | Andres et al. | 335/205 |
| 4,777,656 | 10/1988 | Wade | 455/98 |
| 4,976,641 | 12/1990 | D'Amico | 441/23 |
| 4,981,453 | 1/1991 | Krishan et al. | 441/6 |
| 5,034,847 | 7/1991 | Brain | 362/205 |
| 5,067,920 | 11/1991 | Brisky | 441/25 |

*Primary Examiner*—Gregory C. Issing
*Attorney, Agent, or Firm*—Gerald L. Lett

[57] ABSTRACT

An emergency position indicating radio beacon ("EPIRB") includes a watertight housing with an ON-OFF switch on the outside of the housing which does not require holes through the housing wall. A floatation collar on the housing maintains the EPIRB in an upright position in the water and provides a storage cavity for a lanyard. Conductive grids on the interior of the housing either shield the EPIRB electronics from antenna radiation and form the lower half of the antenna, or couple the antenna to the water which acts as a ground plane, depending on whether the EPIRB is floating in the water or is surrounded by air.

9 Claims, 3 Drawing Sheets

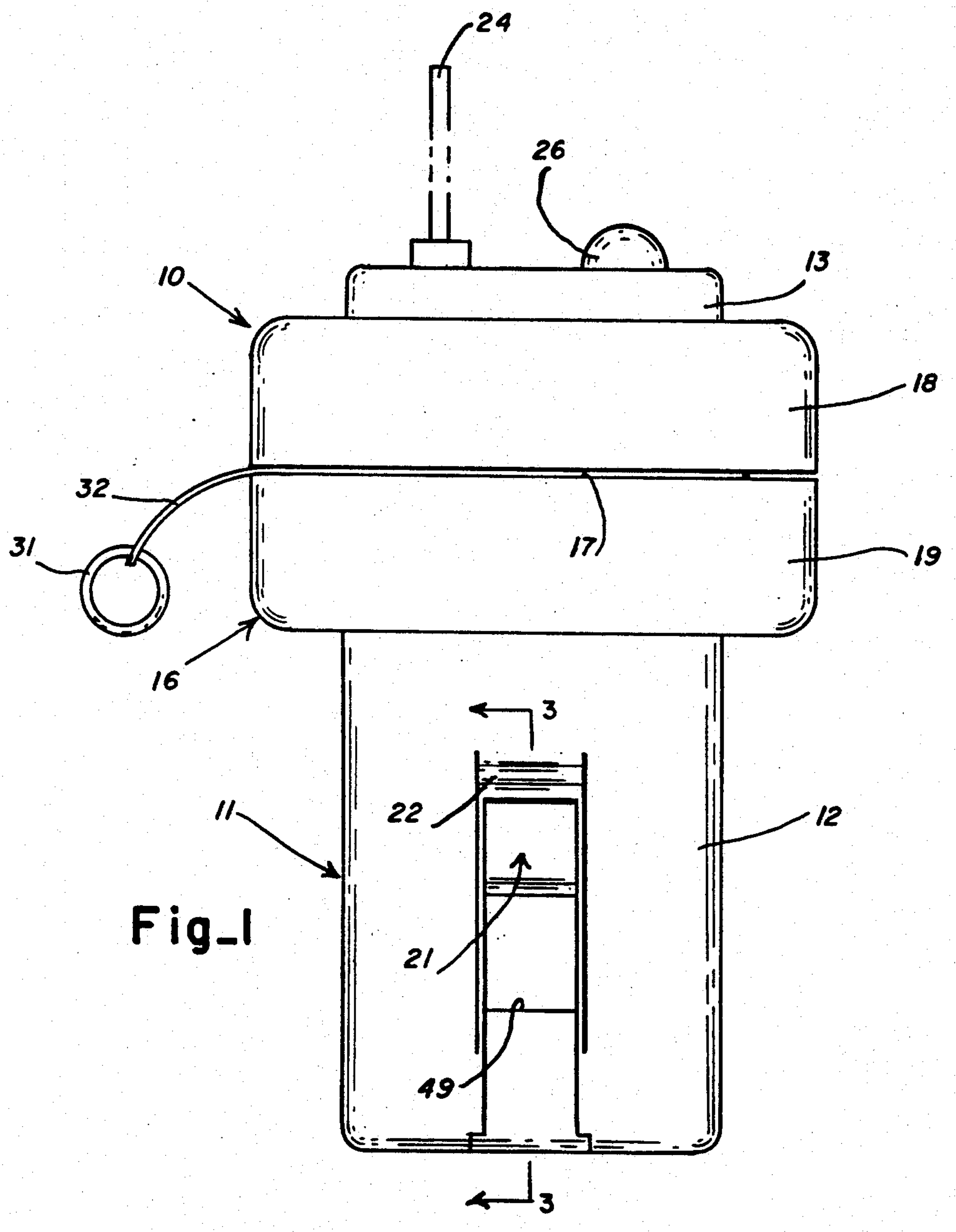
Fig_1
Fig_2
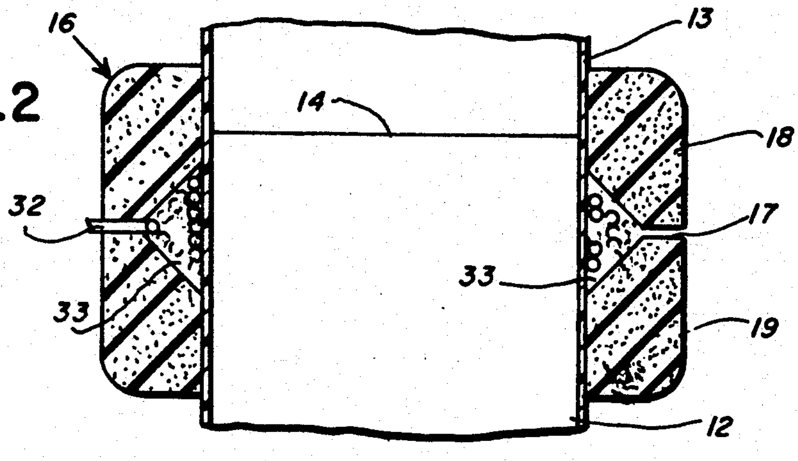

EMERGENCY TRANSMITTER BUOY FOR USE ON MARINE VESSELS

BACKGROUND OF THE INVENTION

The invention relates an emergency transmitter buoy for use on marine vessels.

Emergency position indicating radio beacons ("EPIRBs") are intended for use by mariners in an emergency situation. According to international agreements, the EPIRB transmits a homing signal and beacon signal on one or more predetermined frequencies for reception by search and rescue satellite aided tracking ("SARSAT") satellites in orbit around the earth. The SARSAT uses the beacon signal to determine the position coordinates of the EPIRB and transmits the position to one of several international ground receiving stations. The ground receiving station relays the position coordinates of the EPIRB and a rescue coordination center deploys rescue craft to the EPIRB site in order to provide rescue operations. The homing signal is transmitted by the EPIRB to ground based and other rescue facilities enabling vehicles to home-in on the signals and thus locate the EPIRB and those in distress.

The EPIRB itself is housed in a container which is designed to float on the surface of the water. A lanyard is used to keep the EPIRB in proximity to personnel in a lifeboat or a life jacket; and for efficiency, a means for storage of the lanyard before the EPIRB is deployed is required. The EPIRB container must be water tight; and accordingly, any switches on the outside of the container must be designed to control the electronics within the container but not allow the leakage of water. The EPIRB electronics includes a microprocessor which controls the operation of the transmitter and the form of the signals which are sent. A transmitting antenna on the top of the buoy must be designed to efficiently transmit signals to remote receiving locations when the EPIRB is in or out of the water; however, care must be taken in order to shield the electronics from the signals which are transmitted by the antenna. It would, therefore, be desirable to provide an EPIRB which would satisfy the above operating requirements.

SUMMARY AND OBJECTS OF THE INVENTION

According to the invention, an EPIRB is housed in a small rectangular housing having a floatation collar attached to the upper portion thereof. The floatation collar includes an inner cavity used to store a lanyard which secures the buoy to a life boat or life jacket. The buoy transmitter is put into operation by a switch located on the exterior of the buoy housing which is designed to maintain the waterproof integrity of the housing and be easily actuated by numbed or gloved hands. The transmitter electronics are surrounded by a conductive shield which provides three distinct functions. When the buoy is out of the water, radiation from the antenna is shielded from the transmitter electronics and the shielding forms the second half of a dipole which enables efficient antenna transmission; when the buoy is in the water, the shielding capacitively couples to the water to allow the antenna to transmit as a monopole with the water as the ground plane. With certain modifications, the EPIRB may also be configured as an emergency locator transmitter ("ELT") which in operation is similar to an EPIRB but is intended for aircraft rather than marine use.

It is, accordingly, an object of the invention to provide an EPIRB having a floatation collar which houses a lanyard for use in emergency situations.

It is another object of the invention to provide an external control switch for an EPIRB which maintains the watertight integrity of the housing and is easily actuated.

It is another object of the invention to provide a shielding structure for the EPIRB circuitry which additionally functions out of the water as the lower half of a dipole antenna and in the water to couple to the surrounding sea water, allowing the antenna to transmit as a monopole.

These and other objects of the invention will become apparent from the following detailed description in which reference numerals used throughout the description correspond to numerals found on the drawing figures.

BRIEF DESCRIPTION OF THE DRAWINGS

FIG. 1 is a front view of the EPIRB according to the invention.

FIG. 2 is a view partly in section showing the floatation collar and lanyard used on the EPIRB of FIG. 1.

DESCRIPTION OF THE PREFERRED EMBODIMENT

Figure 3:
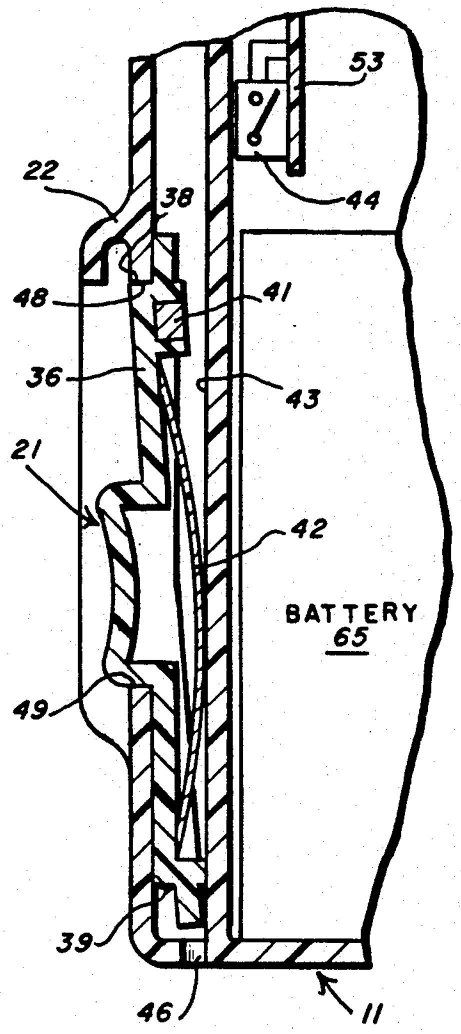
FIG. 3 is a sectional view taken along line 3—3 of FIG. 1 showing the switch used on the EPIRB in the OFF position.

Turning now to FIG. 1, there is shown an emergency position indicating radio beacon ("EPIRB") generally designated by the reference numeral 10. The EPIRB comprises a watertight housing 11 comprising a body 12 and a cap 13 which are secured together at a waterproof joint 14 best seen in FIG. 2. A floatation collar 16 is fitted around the upper portion of the housing 11 and an open seam 17 divides the collar 16 into upper and lower halves 18 and 19. An ON-OFF switch 21 is mounted on the front of the housing 11 in an integral bezel 22. The switch is shown in the ON position. A flexible antenna 24 is mounted on the top surface of the cap 13 next to a lamp 26. A lanyard 32 having a ring 31 attached to one end extends from the open seam 17 of the floatation collar 16. In actual practice, the body 12 and cap 13 may comprise plastic; and the floatation collar 16 may comprise a closed cell foam.

Turning now to FIG. 2, it will be seen that the open seam 17 separating the upper and lower halves 18 and 19 of the floatation collar communicates with a storage cavity 33 which houses a coiled length of the lanyard 32. It will be appreciated that since the seam 17 is continuous around the perimeter of the floatation collar 16, the lanyard 32 may be removed from the storage cavity 33 by pulling on the ring 31 and unwinding the lanyard from around the body 12. If the lanyard 32 is completely removed from the cavity 33 and it is desired to restore the lanyard in the cavity, it is only necessary to wind the lanyard around the open seam 17 while maintaining a tension on the lanyard 32 causing it to slip through the seam and reenter the storage cavity 33. The cavity 33 provides storage for a lanyard which has a length of up to 65 feet.

Figure 4:
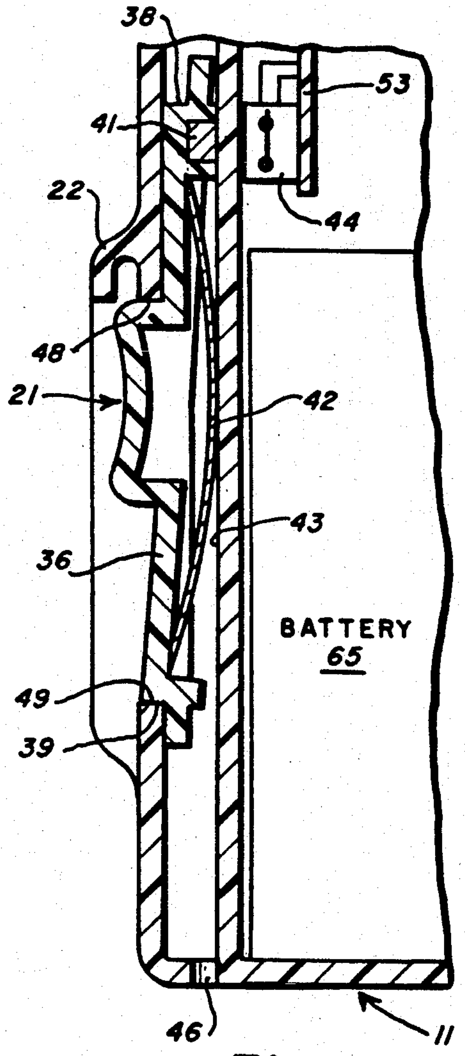
FIG. 4 shows the switch of FIG. 3 in the ON position.

FIGS. 3 and 4 show the switch 21 in greater detail. The switch 21 comprises a sliding element 36 having an upper detent 38 and a lower detent 39. A bow spring 42 is attached to the back of the element 36 and a magnet 41 is mounted opposite the upper detent 38. The bow spring is seated against a back wall 43 which is a portion of the housing 11 and presses the element 36 against the inside surface of the bezel 22. A magnetic switch 44 is mounted on a transmitter printed circuit board 53 located within the housing 11. FIG. 3 shows the switch in the OFF position with the upper detent 38 against the upper catch 48 and the magnet 41 remote from the magnetic switch 44. A drain hole 46 provides drainage for any water and small debris which may find its way into the cavity formed between the bezel 22 and the back wall 43.

FIG. 4 shows the switch in the ON position with the lower detent 39 against the lower catch 49 and the magnet 41 in proximity to the switch 44. In this position, the magnet 41 causes the switch 44 to turn ON. It will be appreciated that the spring 42 in combination with the catch and detent mechanism holds the sliding element 36 in the desired position which is easy to actuate with a numbed or gloved hand by pushing the protruding portion of the sliding element 36 to release the detent from the catch and slide the switch to the desired position. Moreover, the switch construction does not compromise the integrity of the waterproof housing 11 since it does not require holes through the housing wall 43.

Figure 5:
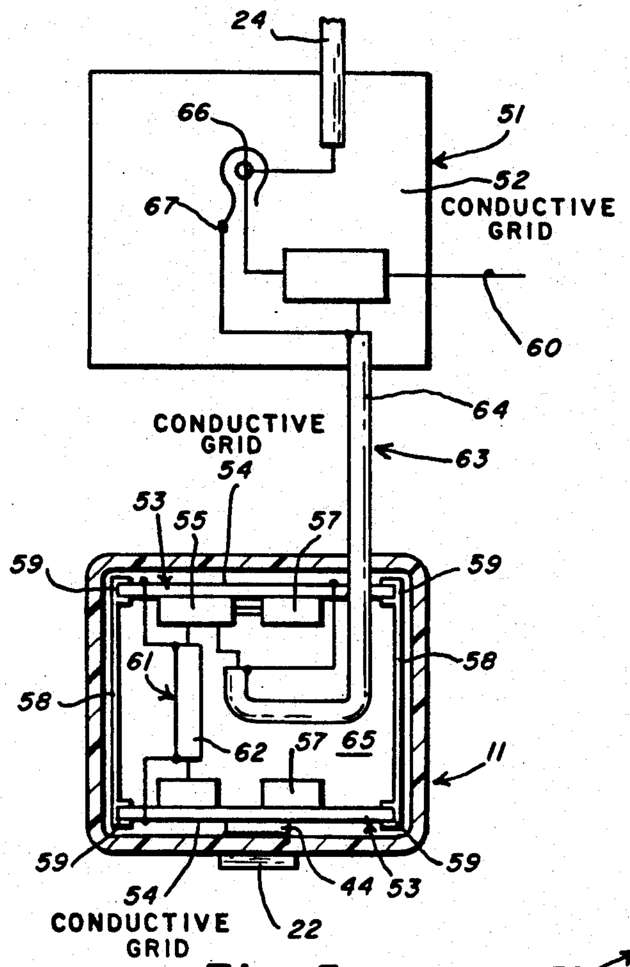
FIG. 5 is a top view of the shielding used on the interior of the EPIRB housing of FIG. 1.

FIG. 5 shows the antenna printed circuit board 51 and two opposed side transmitter circuit boards 53. The antenna board 51 contains a matching network 60 and a coupler 66 for the antenna 24, and the printed circuit boards 53 contain the logic and transmitter circuitry 57 and diplexer 55 for the operation of the EPIRB. A conductive grid 52 is printed on the back of the antenna board 51 and similar conductive grids 54 are printed on the back of each of the transmitter boards 53. The grids 52 and 54 are dimensioned to shield radiation in the frequencies which are transmitted by EPIRB antenna 24. A pair of conductive plates 58 are mounted along the edges of the transmitter boards 53 and together with the conductive grids 52 and 54 comprise five conductive planes which form four sides and the top of a conductive box. The bottom of the conductive box is formed by the battery 65 which is located in the lower portion of the body 12. One terminal of the battery 65 is grounded through the magnetic switch 44 to the conductive grid 54 on the back of one of the transmitter boards 53.

Figure 6:
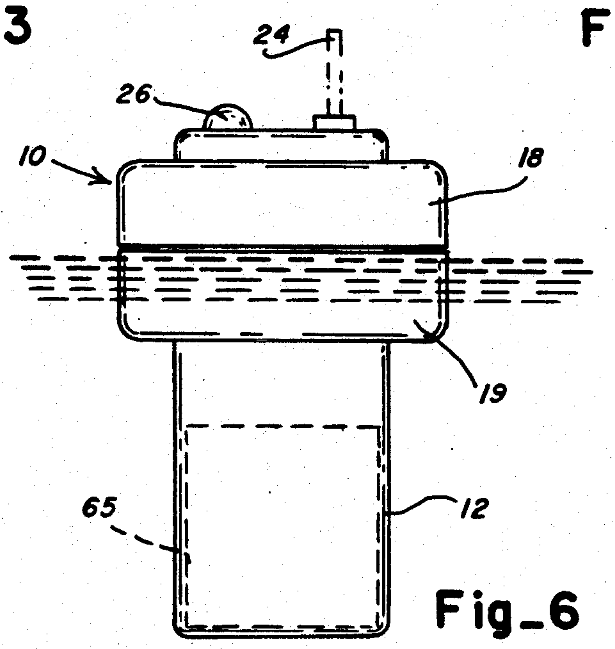
FIG. 6 shows the EPIRB floating in the water.

A coaxial cable 61 couples the transmitted boards 53 together and a coaxial cable 63 couples the diplexer 55 to a matching network 60 on the antenna board 51. The outer shield 62 on both ends of the coaxial cable 61 is coupled to the grids 54 on the transmitter boards 53. The outer shield 64 on one end of the coaxial cable 63 is coupled to the flange 67 of the antenna coupler 66 which is in contact with the grid 52 on the antenna board 51 and the outer shield 64 on the other end is coupled to the grid 54 on the transmitter board 53. The grids 54 on the transmitter boards 53 are connected to the conductive plates 58 by the U-shaped contour 59 on the edges of the plates 58. Thus, the electronics 57 on the transmitter boards 53 are surrounded by five conductive planes at ground potential and on a sixth side by the battery 65 to form a six-sided conductive box which provides three distinct functions. When the EPIRB is out of the water, the six-sided conductive box 1) shields the transmitter electronics mounted on the transmitter boards 53 from radiation from the antenna 24, and 2) forms the second half of a dipole antenna which together with the first half (antenna 24) allows efficient antenna radiation. When the EPIRB is in the water as shown in FIG. 6, the six-sided conductive box 3) capacitively couples to the water allowing the antenna 24 to radiate as a monopole with the water as a ground plane.

Those skilled in the art will recognize that other combinations of a battery, conductive plates, and printed circuit boards may be used to provide the functions of the six-sided conductive box described above.

Figure 7:
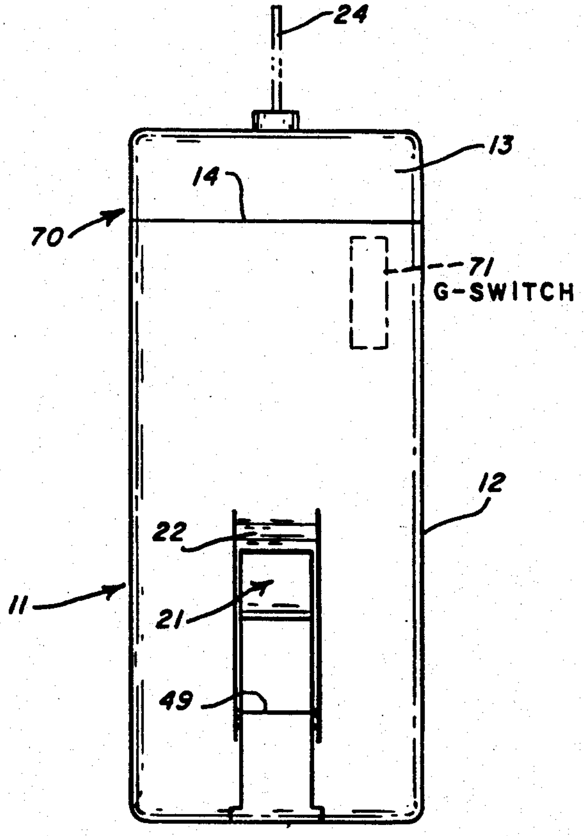
FIG. 7 shows an alternate embodiment of the invention in which the EPIRB is reconfigured as an ELT.

FIG. 7 shows an alternate embodiment of the invention in which the EPIRB is modified to function as an emergency locator transmitter ("ELT"). An ELT is an emergency radio beacon which is carried by aircraft and provides the same rescue functions as the EPIRB in the event of an emergency landing in a remote area. The transmitter electronics in the ELT are similar to those in the EPIRB, with the addition of a G-force sensitive switch to automatically activate the transmitter following a crash landing. The exterior of the ELT is similar to the EPIRB but does not include the lamp. As shown, the ELT also does not include the floatation collar or the lanyard, although these features may be added if desired.

Accordingly, the ELT 70 shown in FIG. 7 comprises a housing 11 including a body 12 and a cap 13 which are secured together at a waterproof joint 14. An ON-OFF switch 21 is mounted on the front of the housing 11 and is surrounded by a bezel 22. When the ELT is removed from the aircraft, a flexible antenna is mounted by the user on the top surface of the cap 13. When the ELT is in the aircraft, it is normally mounted in a bracket and is coupled by a coaxial cable to an antenna on the exterior of the aircraft. The interior of the ELT housing 11 is similar to that of the EPIRB and includes conductive surfaces and a battery which shield the transistor electronics from antenna radiation. The ELT also includes a G-sensitive switch 71 which is mounted on one of the transmitter boards 53. In use, the ELT may be manually activated by means of the switch 21, or, in the event of a crash, is automatically activated by the G-sensitive switch 71.

Having thus described the invention, alterations and modifications will occur to those skilled in the art, which alterations and modifications are intended to be within the scope of the invention as defined by the appended claims.

What is claimed is:

1. An emergency radio beacon comprising transmitter electronics contained in a housing and an external antenna for radiating radio signals, the beacon comprising:

a conductive shield surrounding the transmitter electronics, wherein the conductive shield forms the second half of an antenna in which the external antenna is the first half;

a two-position sliding element on the exterior of the housing for controlling the transmitter electronics;

a magnet mounted on the two-position sliding element;

a magnetic switch mounted on the inside of the position and closed in the other position of the two-position sliding element; and a plurality of conductive grids and a battery in the housing which form the conductive shield.

2. The beacon of claim 1 wherein the conductive grids are formed on one side of printed circuit boards which comprise the transmitter electronics and one terminal of the battery is coupled to the conductive grids.

3. The beacon of claim 1 further comprising:

a G-sensitive switch within the housing for automatically activating the transmitter electronics in response to a high G force.

4. The beacon of claim 1 further comprising:

a floatation collar around the housing and a lanyard, wherein the floatation collar supports the beacon in water and provides storage for the lanyard.

5. The beacon of claim 4 wherein the conductive shield couples to water when the beacon is floating and allows the antenna to radiate as a monopole with the water as a ground plane.

6. An emergency position indicating radio beacon ("EPIRB") including transmitter electronics in a watertight housing, the EPIRB comprising:

an upper antenna half mounted on the external surface of the watertight housing and a lower antenna half located in the interior of the watertight housing, said lower antenna half comprising a plurality of conductive surfaces mounted closely adjacent the walls of the watertight housing, whereby the upper antenna half and the lower antenna half comprise a dipole antenna when the EPIRB is out of the water, and whereby the lower antenna half capacitively couples to the water creating a ground plane for efficient transmission by the upper antenna half as a monopole antenna when the EPIRB is in the water.

7. The EPIRB of claim 6 wherein the plurality of conductive surfaces form a six-sided conductive box which encloses and shields the transmitter electronics from radiation from the antenna.

8. The EPIRB of claim 7 wherein three of the conductive surfaces are formed by conductive grids on one side of the printed circuit boards on which the EPIRB electronics are mounted.

9. The EPIRB of claim 7 in which one of the conductive surfaces is formed by a battery in the EPIRB housing.

* * * * *